United States Patent
Gudorf

(10) Patent No.: US 7,685,815 B2
(45) Date of Patent: Mar. 30, 2010

(54) SYSTEM AND METHOD FOR DRIVER-INITIATED REGENERATION OF A DIESEL PARTICULATE FILTER WHILE A MOTOR VEHICLE IS PARKED

(75) Inventor: Kevin V. Gudorf, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 74 days.

(21) Appl. No.: 11/551,431

(22) Filed: Oct. 20, 2006

(65) Prior Publication Data

US 2008/0093153 A1  Apr. 24, 2008

(51) Int. Cl.
*F01N 3/00* (2006.01)

(52) U.S. Cl. ............................ 60/295; 60/274; 60/280; 60/297; 60/311; 180/65.21; 180/65.51; 180/309

(58) Field of Classification Search ................. 60/274, 60/286, 280, 295, 297, 311; 180/65.1, 65.2, 180/65.3, 65.4, 65.5, 65.6, 65.7
See application file for complete search history.

(56) References Cited

U.S. PATENT DOCUMENTS

| 6,188,944 | B1* | 2/2001 | Kolmanovsky et al. ........ 701/54 |
| 6,422,001 | B1* | 7/2002 | Sherman et al. ............... 60/274 |
| 6,802,180 | B2 | 10/2004 | Gabe et al. |
| 6,910,329 | B2* | 6/2005 | Bunting et al. ................ 60/297 |
| 6,912,848 | B2* | 7/2005 | Bedapudi ...................... 60/297 |
| 7,137,246 | B2* | 11/2006 | van Nieuwstadt et al. ..... 60/295 |
| 7,263,824 | B2* | 9/2007 | Bellinger et al. .............. 60/288 |

* cited by examiner

*Primary Examiner*—Binh Q Tran
(74) *Attorney, Agent, or Firm*—Jeffrey P. Calfa; Mark C. Bach

(57) ABSTRACT

A system and method for driver-initiation of regeneration of a diesel particulate filter using a service brake pedal in a motor vehicle to reduce the risk that the vehicle will become unattended during on-going regeneration.

14 Claims, 2 Drawing Sheets

SYSTEM AND METHOD FOR DRIVER-INITIATED REGENERATION OF A DIESEL PARTICULATE FILTER WHILE A MOTOR VEHICLE IS PARKED

FIELD OF THE INVENTION

This invention relates generally to motor vehicles, such as trucks, that are powered by internal combustion engines, particularly diesel engines that have certain exhaust gas treatment devices for treating exhaust gases passing through their exhaust systems. The invention especially relates to a system and method for controlled regeneration of an after-treatment device, a diesel particulate filter (DPF) in particular, while a vehicle is parked with the engine running.

BACKGROUND OF THE INVENTION

A known system for treating exhaust gas passing through an exhaust system of a diesel engine comprises a diesel oxidation catalyst (DOC) associated with a diesel particulate filter (DPF). The combination of these two exhaust gas treatment devices promotes chemical reactions in exhaust gas and traps diesel particulate matter (DPM) as exhaust flows through the exhaust system from the engine, thereby preventing significant amounts of pollutants such as hydrocarbons, carbon monoxide, soot, SOF, and ash, from entering the atmosphere.

A DPF requires regeneration from time to time in order to maintain particulate trapping efficiency. Regeneration involves the presence of conditions that will burn off trapped particulates whose unchecked accumulation would otherwise impair DPF effectiveness. While "regeneration" refers to the general process of burning off DPM, two particular types of regeneration are recognized by those familiar with the regeneration technology as presently being applied to motor vehicle engines.

"Passive regeneration" is generally understood to mean regeneration that can occur anytime that the engine is operating under conditions that burn off DPM without initiating a specific regeneration strategy embodied by algorithms in an engine control system. "Active regeneration" is generally understood to mean regeneration that is initiated intentionally. either by the engine control system on its own initiative or by the driver causing the engine control system to initiate a programmed regeneration strategy, with the goal of elevating temperature of exhaust gases entering the DPF to a range suitable for initiating and maintaining burning of trapped particulates.

Active regeneration may be initiated even before a DPF becomes loaded with DPM to an extent where regeneration would be mandated by the engine control system on its own. When DPM loading beyond that extent is indicated to the engine control system, the control system forces active regeneration, and that is sometimes referred to simply as a forced regeneration.

The creation of conditions for initiating and continuing active regeneration, whether forced or not, generally involves elevating the temperature of exhaust gas entering the DPF to a suitably high temperature. Because a diesel engine typically runs relatively cool and lean, the post-injection of diesel fuel is one technique used as part of a regeneration strategy to elevate exhaust gas temperatures entering the DPF while still leaving excess oxygen for burning the trapped particulate matter. Post-injection may be used in conjunction with other procedures and/or devices for elevating exhaust gas temperature to the relatively high temperatures needed for active DPF regeneration.

When a vehicle is being operated in a way conducive to active DPF regeneration, such as cruising on a highway, the regeneration process may be conducted with little or no significant effect on vehicle driveability and may be initiated either by the driver or else automatically by a regeneration initiation strategy, possibly even before the DPF becomes loaded with DPM to an extent where forced regeneration would be mandated by the engine control system. The elevated temperature of tailpipe exhaust is typically not a concern on the open road.

However, when a vehicle is parked with the engine running, regeneration may be inappropriate for the surrounding environment due to the elevated temperature of exhaust coming out of the tailpipe. Yet the after-treatment device may at times need regeneration in just such a situation.

SUMMARY OF THE INVENTION

The present invention is directed toward a strategy that allows regeneration to proceed in such a situation, provided that certain conditions indicative of the driver's continuing presence in the vehicle during regeneration are satisfied. In that way, the risk that a driver will initiate a regeneration and then leave the vehicle unattended while the regeneration proceeds is significantly reduced.

Briefly, the invention involves a requirement that with a vehicle parked and the engine running, the driver keep the brake pedal depressed in order to initiate and maintain a regeneration. Failure to do so before the process has been completed will terminate the process. The inventive strategy also conditions continuance of a driver-initiated regeneration on other factors indicating that the vehicle remains stationary and that conditions for regeneration remain favorable.

One general aspect of the invention relates to a vehicle comprising wheels on which the vehicle travels, an engine comprising an exhaust system having an exhaust after-treatment device that requires occasional regeneration, service brakes for braking the wheels when a brake pedal is depressed; a drivetrain for coupling driven wheels to the engine including a device for selectively coupling and decoupling driven wheels to and from the engine, and a system for enabling regeneration of the exhaust after-treatment device.

The system comprises a first signal for indicating to an occupant of the vehicle a need for regeneration and a second signal for enabling regeneration upon concurrence of the signal and depression of the brake pedal.

A second generic aspect relates to the method performed by the system.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
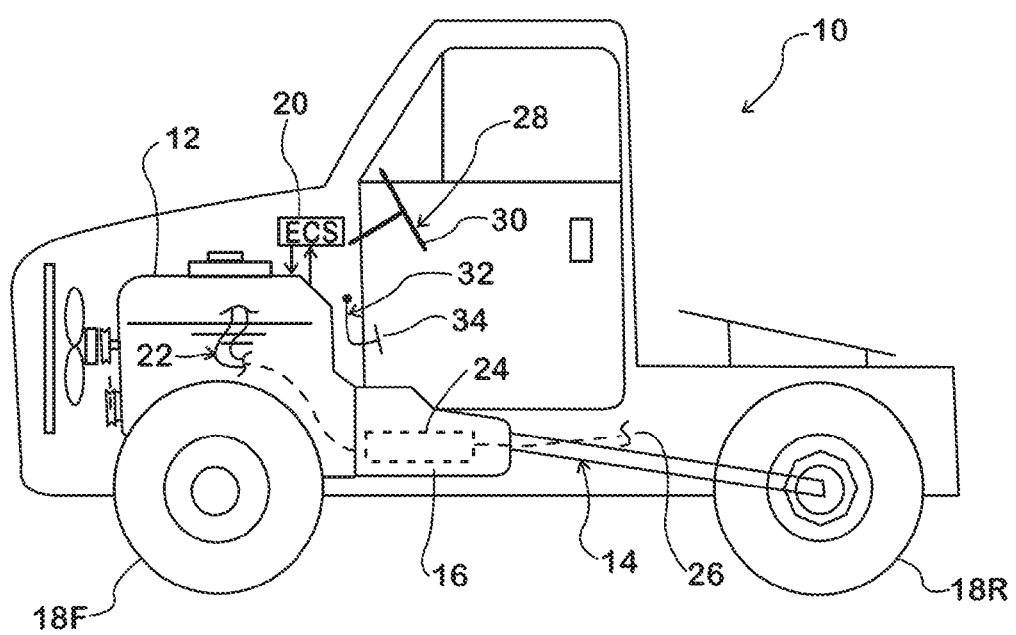
FIG. 1 is an illustration of a representative motor vehicle having a diesel engine with an exhaust after-treatment device that requires occasional regeneration.

FIG. 1 shows a truck 10 having a diesel engine 12 and a drivetrain 14, including a transmission 16, that couples the engine to driven rear wheels 18R for propelling the truck. Engine 12 has a processor-based engine control system (ECS) 20 that processes data from various sources to develop various control data for controlling various aspects of engine operation.

Engine 12 also has an exhaust system 22 for conveying exhaust gases generated by combustion of fuel in cylinders of engine 12 from the engine to the surrounding atmosphere. Exhaust system 22 contains one or more after-treatment devices, one of which is a diesel particulate filter (DPF) 24, for treating exhaust gases before they pass into the atmosphere via a tailpipe 26.

Truck 10 also has a steering system 28, including a steering wheel 30, for steering front wheels 18F, and a service brake system 32, including a brake pedal 34 that when depressed brakes all wheels 18F, 18R.

ECS 20 comprises one or more processors that process various data for calculating control data for various devices in the truck. ECS 20 repeatedly processes data relevant to determining the extent to which DPF 24 is loaded with DPM. When the result of such processing discloses that DPF 24 requires regeneration, ECS 20 provides an appropriate signal.

If a regeneration initiation algorithm in ECS 20 provides for automatically forced regeneration in consequence of such a signal, provided that favorable regeneration conditions, such as highway cruising, are present, then regeneration proceeds under control of ECS 20 without driver initiation.

If truck 10 were parked with engine 12 running when ECS issued a signal disclosing a need for DPF regeneration, then the inventive strategy would be utilized. That strategy will now be explained with reference to FIG. 2 where the general reference numeral 40 refers to the inventive strategy.

Figure 2:
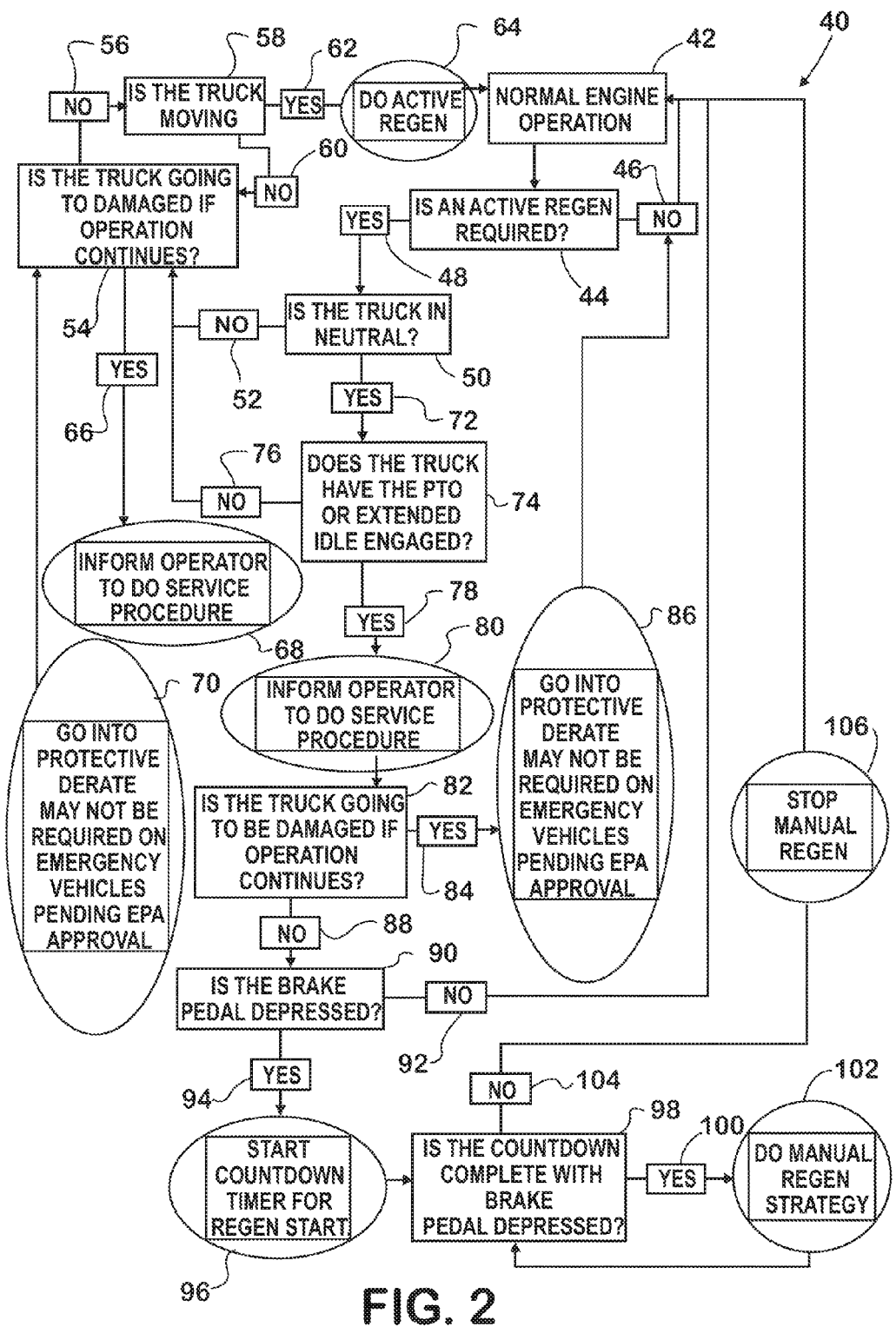
FIG. 2 is a general strategy diagram showing application of the present invention to the motor vehicle.

Strategy 40 is performed by suitable algorithms implemented in ECS 20 to process data from various sources for accomplishing the steps shown in FIG. 2. The reader should therefore appreciate that FIG. 2 does not include detail of actual processing programs in ECS 20, while recognizing that such processing programs can be developed by conventional programming techniques based on the level of detail presented in FIG. 2, as further detailed by the written text presented here.

With engine 12 running normally (reference numeral 42), a processing step 44 monitors data to ascertain if DPF 24 requires regeneration. As long as no need for regeneration is disclosed (reference numeral 46), step 44 will be repeated at the next iteration of the algorithm.

Once a need for regeneration is disclosed (reference numeral 48), the strategy seeks information about certain other aspects of vehicle/engine operation. A need for regeneration can be determined by any of various known techniques that need not be described in detail here. One item of information of interest, determined by a step 50, is whether engine 12 is or is not engaged with driven wheels 18R. That item is provided by the status of transmission 16. If transmission 16 is in gear, meaning that wheels 18R can be or actually are being driven by engine 12 and that the transmission is not in a neutral position (reference numeral 52), the strategy proceeds to the next item of interest which is the possibility of potential damage if regeneration were to be initiated (reference numeral 54).

If the potential is found not to be present (reference numeral 56), as determined by an appropriate algorithm whose specific details need not be described here, a step 58 seeks still further information about whether the truck is moving. The specific data processed by step 58 can be obtained from any suitable source, such as a vehicle speed sensor.

If the truck is not in motion (reference numeral 60), the strategy iterates by repeatedly performing steps previously described until step 58 discloses that the truck is in motion (reference numeral 62). With the truck in motion, regeneration is initiated (reference numeral 64), with the process thereafter being controlled by a regeneration algorithm. This would not be a driver-initiated regeneration although it would be an active regeneration.

Had step 54 disclosed that the potential for internal damage to the engine and/or its associated systems existed (reference numeral 66), then steps 68 and 70 would have been repeatedly performed until appropriate measures had been taken to allow step 58 to be performed. When the potential for damage is indicated, step 68 informs the operator, i.e. driver, via any suitable medium such as a lamp or message to perform a service procedure. Step 70 is a protective de-rate step that restricts engine power to limit soot production. This should alert the driver to the importance of the situation while allowing engine operation to be prolonged.

Had step 50 disclosed that transmission 16 was not in gear (reference numeral 72), then a step 74 would have determined whether or not engine 12 was being controlled by ECS 20 in a manner that would be expected to allow the engine to continue running (reference numeral 74), meaning in other words that the engine either was operating a vehicle-controlled operating system, such as a power take-off (PTO), that was maintaining or increasing engine speed above idle or matching engine torque output independent of engine load, or that an idle shut-down timer that is commonly present in some trucks had been overridden by some appropriate action of the driver so that idle shut-down won't occur.

Should step 74 determine that engine 12 is not being controlled appropriately for continued operation (reference numeral 76), then step 54 will follow, with further processing occurring by steps as already described. Should step 74 determine that engine 12 is being controlled appropriately for continued operation (reference numeral 78), then a step 80 occurs, followed by a step 82 that is like step 54 in that it determines whether the potential for damage to the engine and/or engine systems exists.

If step 82 discloses that the potential for damage exists (reference numeral 84), then a step 86 that is like step 70 occurs with the consequence of the strategy determining that no regeneration is required (step 46), with the strategy ceasing to execute further until its next iteration.

If step 82 discloses that no potential for damage exists (reference numeral 88), then a step 90 determines whether or not brake pedal 34 is being depressed. Depression of the brake pedal can be disclosed by the actuation of a brake pedal switch.

If step 90 discloses that brake pedal 34 is not being depressed (reference numeral 92), the strategy ceases to execute further until its next iteration.

If step 90 discloses that brake pedal 34 is being depressed (reference numeral 94), the strategy performs a step 96 that starts a timer as a countdown before regeneration is actually initiated. The length of the countdown defines a certain amount of time that can be a programmable preset in a processor of ECS 20.

For regeneration to be initiated at the end of the countdown time, the brake pedal must either have been kept continually depressed during the countdown time to keep the timer running, or if released after having started the timer with the timer being allowed to continue counting after release, must be depressed at the time that the countdown time ends. Steps 98 and 100 define those possibilities, and when either is satisfied, regeneration is initiated (step 102). This would be a driver-initiated active regeneration, sometimes referred to simply as a manual regeneration (manual regen).

Once initiated by step 102, regeneration is allowed to continue only so long as brake pedal 34 remains depressed. Therefore, should brake pedal 34 cease to be depressed, that fact will be disclosed by step 98 as steps 98, 100 repeat during iterations of the strategy. When cessation of pedal depression is disclosed (reference numeral 104), active regeneration is promptly discontinued (reference numeral 106), with passive regeneration possibly continuing for a short time, perhaps up to about three minutes depending on factors such as filter size, operating temperature, and flow rate through the engine. The use of a continually depressed brake pedal to continue regeneration, once regeneration has been initiated, is intended to assure that the driver remains in the vehicle and avoid a situation that allows the driver to depart the vehicle and leave it unattended while regeneration continues. The control system may allow for occasional time-limited release of the brake pedal to avoid driver fatigue while still accomplishing the objective of maintaining driver diligence to vehicle operation, for example by requiring the driver to regularly tap the brake pedal.

When step 44 discloses that regeneration is needed, a signal is given to the driver. The signal may be given in any appropriate way that will be recognized by the driver for what it is, such as by a message on a message screen, illumination of a light on the instrument panel, etc.

After step 44 has caused a signal to be given, the act of depressing the brake pedal merely enables a regeneration but does not actually cause the engine and/or associated devices to begin operating in ways that begin to raise exhaust gas temperature. Such enablement is represented by an enabling signal. A signal that actually causes the engine and/or associated devices to begin operating in ways that start raising exhaust gas temperature is given only after countdown mentioned above has been completed.

While a presently preferred embodiment of the invention has been illustrated and described, it should be appreciated that principles of the invention apply to all embodiments falling within the scope of the invention defined by the following claims.

What is claimed is:

1. A vehicle comprising:
   wheels on which the vehicle travels;
   an engine comprising an exhaust system having an exhaust after-treatment device that requires occasional regeneration;
   service brakes for braking the wheels when a brake pedal is depressed;
   a drivetrain for coupling driven wheels to the engine including a drivetrain device for selectively coupling and de-coupling driven wheels to and from the engine;
   a system for enabling and initiating regeneration of the exhaust after-treatment device comprising a first signal for indicating to an occupant of the vehicle a need for regeneration, a second signal caused by the occupant's depression of the brake pedal to request regeneration, a timer whose starting is conditioned on occurrence of both the first signal and the second signal, and a third signal for initiating regeneration provided that at the end of a length of time after the timer has started the occupant is depressing the brake pedal to cause the second signal to be given.

2. A vehicle as set forth in claim 1 in which the system also conditions starting of the timer on the drivetrain device de-coupling the driven wheels from the engine.

3. A vehicle as set forth in claim 2 in which the drivetrain device comprises a transmission that when placed in a neutral gear de-couples the driven wheels from the engine.

4. A vehicle as set forth in claim 1 in which the first signal is given via a device in an instrument panel of the vehicle.

5. A vehicle as set forth in claim 1 in which the exhaust after-treatment device comprises a diesel particulate filter.

6. A method for occupant-initiated regeneration of an exhaust after-treatment device in an exhaust system through which exhaust gases resulting from combustion in an engine that propels a vehicle exit the engine, the method comprising:
   enabling regeneration upon occurrence of both a first signal for indicating to an occupant of the vehicle a need for regeneration and a second signal caused by the operator's depression of a brake pedal that operates service brakes of the vehicle, and initiating regeneration by a third signal whose occurrence is conditioned on occurrence of the first signal and the second signal; and
   starting a timer upon occurrence of both the first signal and the second signal and causing the third signal to occur after a certain amount of time has elapsed on the timer.

7. A method as set forth in claim 6 including conditioning occurrence of the third signal on a drivetrain device de-coupling driven wheels of the vehicle from the engine.

8. A method as set forth in claim 7 in which the step of conditioning occurrence of the third signal on a drivetrain device de-coupling driven wheels of the vehicle from the engine comprises placing a transmission in a neutral gear to de-couple the driven wheels from the engine.

9. A method as set forth in claim 6 comprising conditioning running of the timer on the brake pedal continuing to be depressed.

10. A method as set forth in claim 9 comprising conditioning the continuation of regeneration, once initiated by the third signal, on the brake pedal continuing to be depressed.

11. A method as set forth in claim 6 comprising giving the first signal via a device in an instrument panel of the vehicle.

12. A method as set forth in claim 6 including causing regeneration of a diesel particulate filter after the third signal has occurred.

13. A method as set forth in claim 6 including conditioning occurrence of the third signal on the brake pedal being depressed to give the second signal at the time that the certain amount of time has elapsed on the timer.

14. A method as set forth in claim 13 comprising conditioning continuation of regeneration, once initiated by the third signal, on the brake pedal being at least occasionally depressed.

* * * * *